US008423345B1

(12) United States Patent
Aldrich et al.

(10) Patent No.: US 8,423,345 B1
(45) **Date of Patent: *Apr. 16, 2013**

(54) MAPPING BETWEEN CODE COVERAGE AND MODEL COVERAGE FOR A DESIGN

(75) Inventors: William J. Aldrich, Natick, MA (US); Mirko Conrad, Watertown, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,648

(22) Filed: Jun. 27, 2012

Related U.S. Application Data

(63) Continuation of application No. 11/970,684, filed on Jan. 8, 2008, now Pat. No. 8,234,105.

(51) Int. Cl.
*G06F 9/45* (2006.01)

(52) U.S. Cl.
USPC ............. 703/22; 717/106; 717/127; 717/131; 714/E11.217

(58) Field of Classification Search .................. 703/1, 6, 703/13, 22; 714/E11.207, E11.217; 717/100, 717/106, 108, 109, 127, 131, 135
See application file for complete search history.

(56) References Cited

U.S. PATENT DOCUMENTS

| | | | |
|---|---|---|---|
| 5,724,504 | A | 3/1998 | Aharon et al. |
| 6,272,672 | B1 | 8/2001 | Conway |
| 6,373,484 | B1 | 4/2002 | Orell et al. |
| 6,536,036 | B1 | 3/2003 | Pavela |
| 6,804,634 | B1 | 10/2004 | Holzmann et al. |
| 7,099,812 | B2 | 8/2006 | Boehm |
| 7,120,568 | B1 | 10/2006 | Geist et al. |
| 7,124,383 | B2 | 10/2006 | Chen et al. |
| 7,315,973 | B1 | 1/2008 | Wise |
| 7,428,715 | B2 | 9/2008 | Fournier et al. |
| 7,530,054 | B2 | 5/2009 | Reimer et al. |
| 7,617,415 | B1 | 11/2009 | Kadakia |
| 7,680,632 | B1 | 3/2010 | Aldrich |
| 7,720,662 | B1 | 5/2010 | Aldrich |
| 7,729,894 | B1 | 6/2010 | Aldrich |
| 7,734,455 | B1 | 6/2010 | Aldrich |
| 2008/0086446 | A1 | 4/2008 | Zhang et al. |
| 2008/0098349 | A1 | 4/2008 | Lin et al. |

OTHER PUBLICATIONS

Co-pending U.S. Appl. No. 11/970,684, filed Jan. 8, 2008 entitled "Mapping Between Code Coverage and Model Coverage for a Design" by William J. Aldrich et al., 43 pages.

Aldrich, W., "Using Model Coverage Analysis to Improve the Controls Development Process," Aerospace and Defense Digest, Feb. 2004, pp. 1-13.

Seungbeom et al., "Higher-Level State Machine Based Coverage Analysis in RTL Verification," IEEE International Sympoisium on Communications and Information Technology, 2004, pp. 1090-1093.

*Primary Examiner* — Russell Frejd
(74) *Attorney, Agent, or Firm* — Harrity & Harrity, LLP

(57) ABSTRACT

Coverage data may be collected for a model. The coverage data may include model coverage data and code coverage data for test cases input to the model. The coverage data may be presented to a user as data indicating a correspondence between coverage outcomes for the model and coverage outcomes for the code used to implement the model.

20 Claims, 10 Drawing Sheets

MAPPING BETWEEN CODE COVERAGE AND MODEL COVERAGE FOR A DESIGN

RELATED APPLICATION

This application is a continuation of U.S. patent application Ser. No. 11/970,684, filed Jan. 8, 2008, now U.S. Pat. No. 8,234,105 the disclosure of which is incorporated by reference herein in its entirety.

BACKGROUND

Technical computing environments are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks such as research and product development.

Existing technical computing environments may be implemented as or run in conjunction with a graphically-based environment. For example, in one existing graphically-based technical computing environment, graphical simulation tools allow models to be built by connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail.

Models generated with graphical simulation tools may be directly converted to computer code by the graphical simulation tool, which can then be executed in the target environment. For example, a model of a control system for an automobile may be graphically developed with the graphical simulation tool, implemented as code, and then deployed in an embedded system in the automobile.

It is often desirable that a graphical model be tested or verified before a system using the model is deployed. One technique for verifying a model is based on a coverage analysis of the model. In general, coverage analysis may provide a measure of how complete test data input to the model was in testing the model. Knowing the completeness of testing can be important in determining whether a model is ready to be implemented in a "live" system. For example, if the coverage analysis indicates that certain portions of the model or the code used to implement the model were not used when the model was run with the test data, it may be desirable to revise the model or the test data to obtain more complete coverage.

A concept related to model coverage is code coverage. Code coverage analysis may be used to dynamically analyze the way that a program executes. Similar to model coverage analysis, with code coverage analysis, it may be desirable to determine the completeness with which program code was executed during testing.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
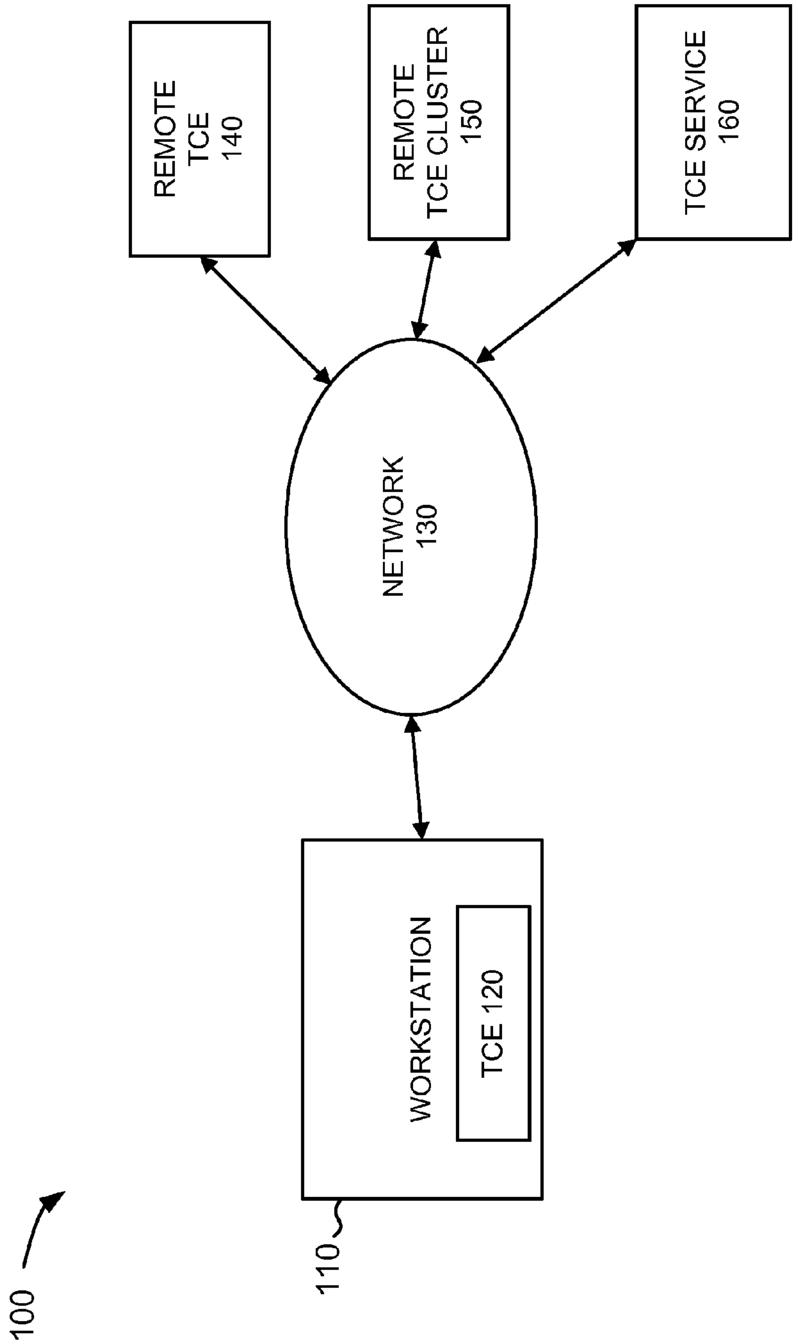
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

Overview

Implementations described herein relate to a technical computing environment in which users may construct and test graphical models. A coverage analysis component may generate coverage information when testing the models. The coverage information may include coverage information relating to both the model and the program code that is used to implement the model. Additionally, the coverage analysis component may keep track of the relationships between model coverage and code coverage. Users may view this relationship information. A user may, for example, use this information to rapidly identify portions of the design that cause the model coverage and code coverage to diverge.

Definitions

A "technical computing environment," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a technical computing environment may include a dynamically-typed programming language (e.g., the M language) that can be used to express problems and/or solutions in mathematical notations. For example, a technical computing environment may use an array as a basic element, where the array may not require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools or blocks (e.g., for creating plots, surfaces, images, volumetric representations, etc.). In one implementation, a technical computing environment may provide these functions and/or tools using toolboxes (e.g., toolboxes for signal processing, image processing, data plotting, parallel processing, etc.). In another implementation, a technical computing environment may provide these functions as block sets. In still another implementation, a technical computing environment may provide these functions in another way, such as via a library, etc.

A technical computing environment may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

"Coverage" or "Coverage Analysis," as used herein, refers to techniques for determining the completeness of testing of a model or of program code. In coverage analysis, criteria may be defined for the primitive elements that make up a programming language or design environment. When the programming code or design is executed or simulated, the criteria may be measured for each instance of the primitive elements.

System Description

FIG. 1 is an exemplary diagram of a system 100 in which concepts described herein may be implemented. The system may include a personal computer or workstation 110. Workstation 110 may execute a technical computing environment (TCE) 120 that presents a user with an interface that enables efficient analysis and generation of technical applications. For example, the TCE may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, TCE 120 may be run by multiple networked computing devices or by one or more remote computing devices. In such an implementation, the TCE may be executed in a distributed manner, such as by executing on multiple computing devices simultaneously. Additionally, in some implementations, the TCE may be executed over a network 130 in a client-server relationship. For example, workstation 110 may act as a client that communicates with, using a web browser, a server that stores and potentially executes the TCE program.

For example, as shown in FIG. 1, system 100 may include a remote TCE 140 (e.g., a remotely located computing device running a TCE), a remote TCE cluster 150, and/or a TCE service 160. Remote TCE cluster 150 may include multiple computing devices that run TCEs that execute in a distributed or parallel manner. TCE service 160 may include a server computing device that provides a TCE as a remote service. For instance, a TCE may be provided as a web service. The web service may provide access to one or more programs (e.g., TCE) provided by TCE service 160. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., workstation 110) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

Figure 2:
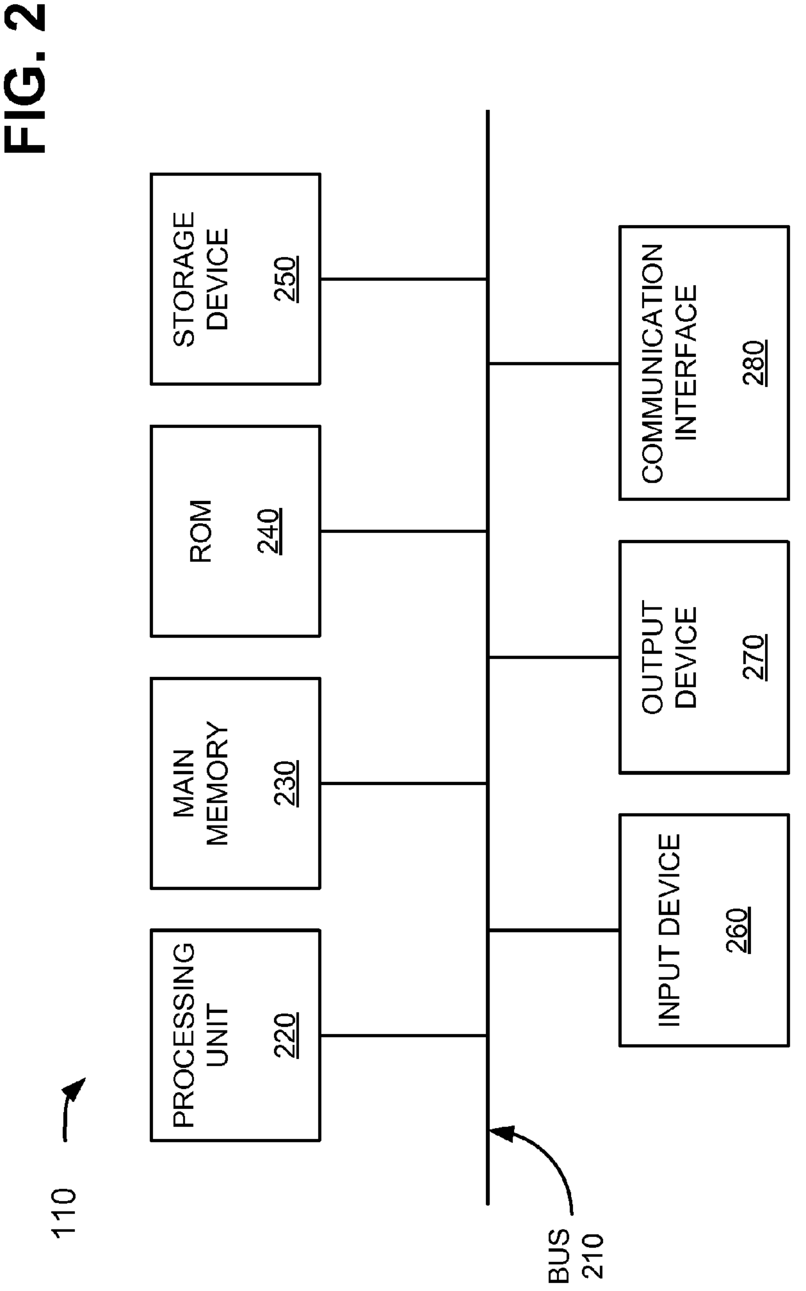
FIG. 2 is a diagram of an exemplary device corresponding to the workstation of FIG. 1.

FIG. 2 is a diagram of an exemplary device corresponding to workstation 110. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard 105, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium may particularly include a technical computing environment. The TCE may include any of the features defined above with respect to the term "technical computing environment." For example, in one implementation, the technical computing environment may include MATLAB® software that provides a variety of mathematical functions and/or graphical tools.

Although FIG. 2 shows exemplary components of workstation 110, in other implementations, workstation 110 may contain fewer, different, or additional components than depicted in FIG. 2. In still other implementations, one or more components of workstation 110 may perform one or more tasks performed by one or more other components of workstation 110.

Technical Computing Environment

Figure 3:
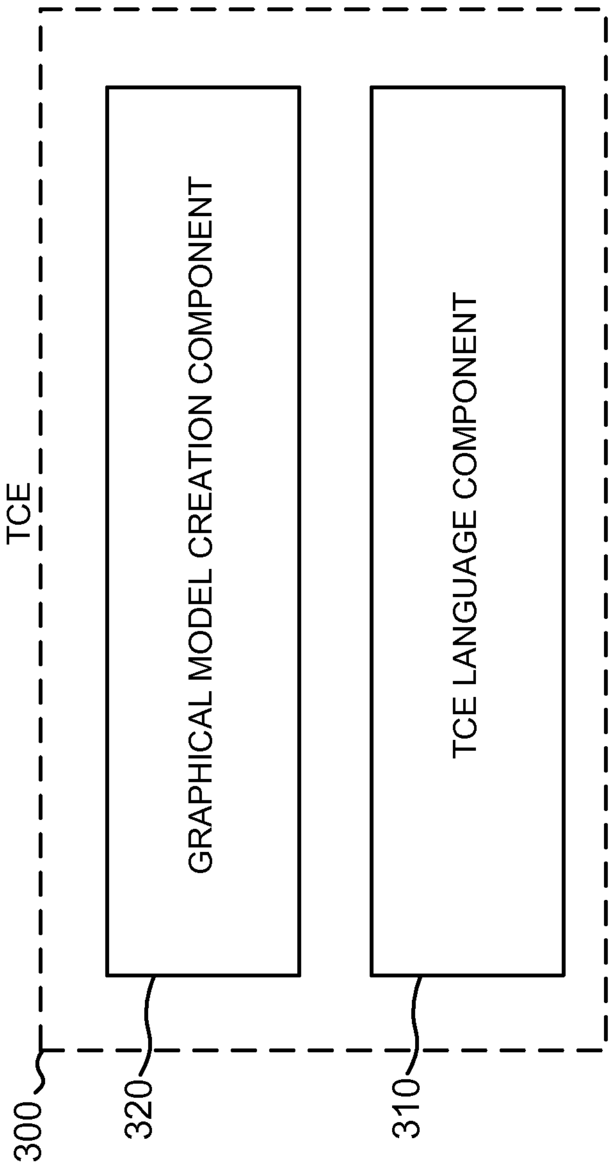
FIG. 3 is a diagram illustrating functional components of a technical computing environment (TCE)

FIG. 3 is a diagram illustrating functional components of a technical computing environment (TCE) 300. As mentioned, TCE 300 may include a program stored on a computer-readable medium, such as main memory 230 or ROM 240 in workstation 110. In other implementations, TCE 300 may be associated with another device separate from workstation 110, and may accessed by workstation 110 via communication interface 280 and a network. In yet other implementations, all or part of TCE 300 may be implemented in hardware.

TCE 300 may include a TCE language component 310 and a graphical model creation component 320. TCE language component 310 may generally function to implement a technical computing language. TCE language component 310 may, for example, provide an interface that integrates computation, visualization, and programming in a relatively easy-to-use environment where problems and solutions can be expressed in mathematical notation familiar to technical users.

Graphical model creation component 320 may include software for modeling, simulating, and/or analyzing dynamic systems. Graphical model creation component 320 may, for instance, support linear and nonlinear systems, models in continuous time, sampled time, or a hybrid of the two. Systems modeled with graphical model creation component 320 may be constructed using a graphical interface that allows the user to arrange blocks that represent functionality and/or data. Graphical model creation component 320 may additionally allow users to execute or run the created model and to view and analyze results of the model.

In general, graphical model creation component 320 can be used to graphically generate designs (i.e., models) that simulate the behavior of the design. The models may be used to facilitate communication, peer-review, and iterative refinement with visual representations that simplify understanding. Graphical model creation component 320 may include specialized blocks that can define error or fault conditions and that can be used to identify design flaws.

As described herein, TCE 300 may be implemented by logic that provides coverage analysis information to the user. The coverage analysis may relate to coverage of models generated with graphical model creation component 320.

Before describing coverage analysis in additional detail, it will be helpful to describe an exemplary model generated with graphical model creation component 320.

Figure 4:
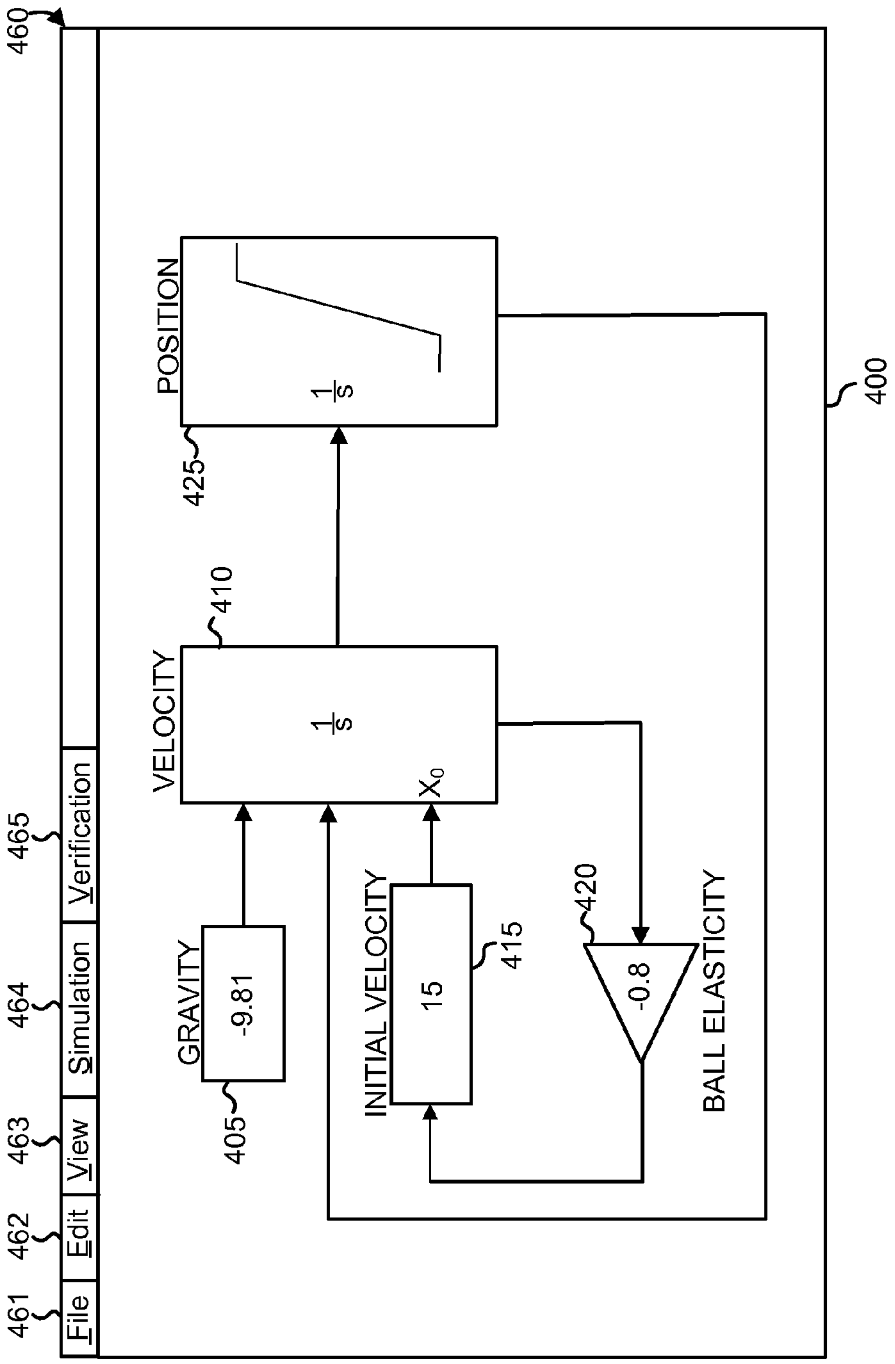
FIG. 4 is a diagram illustrating a graphical interface in which a model may be generated.

FIG. 4 is a diagram illustrating an exemplary graphical interface in which a model may be generated with graphical model creation component 320. The graphical interface may include a model area 400 in which a model (e.g., constructed of blocks) can be built by a user. The model described below as being constructed in model area 400 represents only one example of a model that may be generated using graphical model creation component 320. Many different models, or types of models, may be generated using graphical model creation component 320.

A user may select blocks and place the blocks in model area 400. For example, a user may select a block from a block library and may move the block into model area 400 using a pointing device, such as a mouse. A block may represent functionality and/or data and may be defined using any of a number of possible programming languages. A block may also itself be defined by one or more other blocks.

In some implementations, a model may include elements other than graphical blocks. For example, a model may additionally include user created external source code and/or state diagrams.

In the example of FIG. 4, model area 400 includes a model simulating the behavior of a ball dropped from an initial height. The model may include a number of blocks 405, 410, 415, 420, and 425. Each of blocks 405-425 may represent elements from which a model may be built (e.g., blocks may be primitive elements of the model). The model shown in FIG. 4 may have been generated by a user placing each of blocks 405 through 425 in model area 400, connecting inputs and outputs of the blocks to create logical connections between the blocks, and configuring parameters relating to the blocks.

Menu bar 460 may include a number of graphically selectable menu options, such as a file menu option 461, an edit menu option 462, a view menu option 463, and a simulate menu option 464. Each menu option may correspond to, for example, a user-selectable command or a sub-menu with additional commands.

As shown in FIG. 4, a constant block 405 may be used to represent the constant acceleration due to gravity (−9.81). Block 415 may represent the initial velocity of the ball (e.g., 15 meters/second in this example). Lines may be connected from blocks 405 and 415 to block 410, indicating that the outputs of blocks 405 and 415 may be inputs to block 410. Blocks 410 and 425 may be integrator blocks which have been labeled "velocity" and "position," respectively, and the output of these blocks may represent the velocity and position of the ball. The output of block 420 may be input to block 415 and the output of block 425 may be fed back to block 410. A second output of block 410 may be input to gain block 420, which is labeled as ball elasticity. The output of gain block 420 may modify initial velocity block 415.

A user, after constructing the model represented by blocks 405 through 425, may instruct, via simulate menu option 464, graphical model creation component 320 to simulate (e.g., run) the model, which may cause graphical model creation component 320 to implement the system defined by blocks 405 through 425.

Coverage Analysis

Coverage analysis, as previously mentioned, may be defined as a technique for determining the completeness of testing. In coverage analysis, criteria of execution completeness may be defined for the primitive elements (e.g., graphical blocks or sections of code) that make up a language or model. When the program code or model is executed or simulated, such as by TCE 300, the criteria may be measured for each instance of the primitive element.

Figure 5:
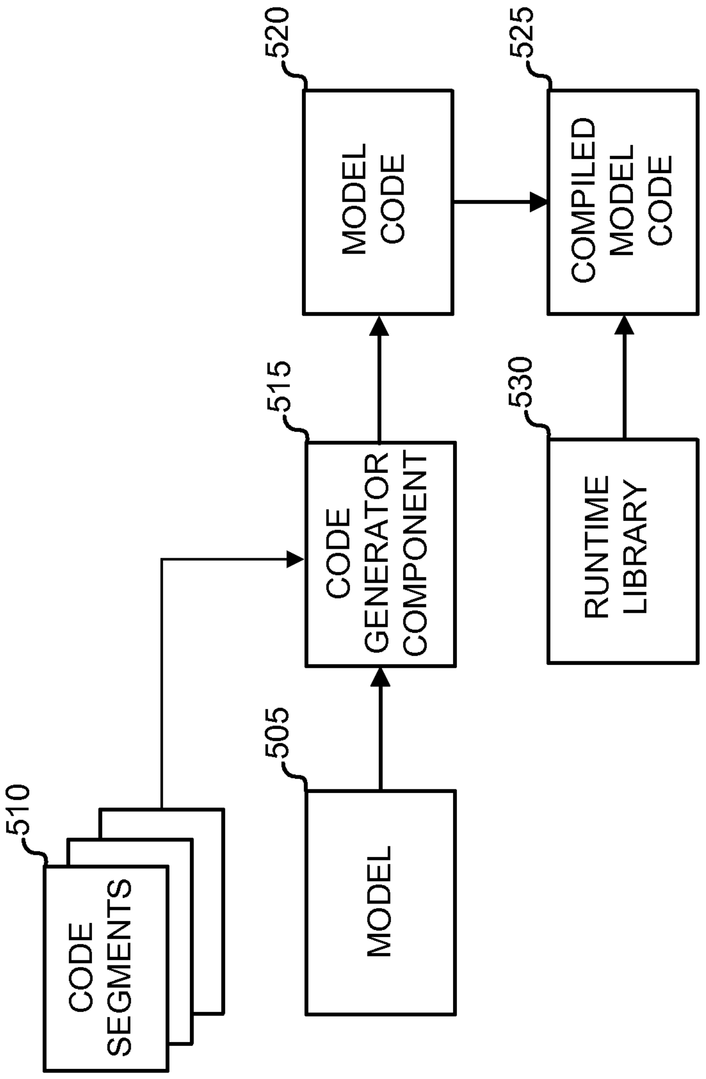
FIG. 5 is a diagram conceptually illustrating exemplary components for generating program code for a model.

Before describing the operation of coverage analysis component 315 in additional detail, it may be helpful to generally describe the generation of program code for a model. FIG. 5 is a diagram conceptually illustrating exemplary components for generating program code for a model.

As shown in FIG. 5, code generation for a model may be based on code segments 510 and a model 505 for which the code is to be generated. Model 505 may include the graphical model designed by the user, such as the exemplary model shown in FIG. 4. Code segments 510 may include a number of code segments that correspond to the primitive blocks used in designing model 505. For example, each code segment 510 may be a segment of C code that corresponds to a primitive block defined in graphical model creation component 315. In some implementations, code segments 510 may be implemented in a form other than relatively low level computer code. For example, each code segment may include intermediate representations of the semantic meaning of the graphical model primitives. Although code segments 510 do not necessarily need to be implemented as code fragments or portions, for convenience of the description herein, code segments 510 will be generally described as segments of computer code.

Code generator component 515 may combine code segments 510 based on model 505 to produce model code 520 (i.e., the code that implements, when compiled, the model). Model code 520 may include, for example, C code. Model code 520 may be compiled to obtain compiled model code 525. Compiled model code 525 may be used as the "deployable" version of the model. For example, compiled model code 525 may be installed in an embedded system to provide control or other functions for the system. Runtime library 530 may include control information that is called when executing compiled model 525. Runtime library 530 may, for example, describe how elements of model 505 are updated from one time segment to another.

Assume that a user has designed a model, such as the model 505, and would like to generate code to implement the model. The user may instruct TCE 300, such as via menu 460, to generate code for the model. TCE 300 may include a number of code segments 510 that each represent different primitive elements in model 505. Code generator component 515 may assemble code segments 510 in an arrangement that implements model 505 to obtain model code 520. The code generation may optimize and transform the semantic representations (e.g., code segments 510) to obtain more efficient code. The optimizations may include such operations as variable substitutions, elimination of dead paths, and other simplifications. The result of these optimizations may cause the initial code segments to become partially or completely modified or intermingled with the code from other blocks.

It may be desirable to perform a coverage analysis of model code 520 to obtain an indication of the completeness of testing based on the code structure of model code 520. Additionally, it may be desirable to perform a coverage analysis of model 505. Coverage analysis of model 505 can be used to, for instance, indicate the completeness of a set of requirements. For example, coverage analysis of model 505 may be used to identify gaps in a specification where the designer and implementer may have different ideas of the correct behavior of the model.

Code generator component 515 may collect coverage information by modifying model code 520 so that information relating to coverage is obtained while the design embodied by the model is run. Coverage information may be conceptually defined as two different types of coverage: code coverage and model coverage.

Code coverage relates to testing completeness of statements, decisions, or conditions in the code. Code coverage may be obtained by modifying model code 520 to obtain coverage information relating to coverage of the underlying code. Code coverage can include, for example, statement coverage (i.e., verifying that every statement in a program has executed at least once), decision coverage (i.e., verifying that each control flow point in a program has taken every possible outcome at least once), and condition coverage (i.e., verifying that every condition to a logical statement has taken a true and a false value at least once). In addition to basing code coverage on these control flow graph based criteria, code coverage can also be based on data flow. Data flow coverage is used to ensure that values in a system are created and used correctly. Data flow coverage may focus on, for example, definitions and uses of values, where a definition may be a location where a value for a variable is stored in memory and a use may be a location where a variable value is accessed.

Model coverage, in contrast to code coverage, may be used to indicate completeness relative to the elements within the graphical model. Model coverage may be implemented by running the model with test cases that were determined based on requirements for the model. For example, a test case for a model designed to control altitude of a plane may state that when an altitude parameter is set to a desired value that increases the altitude by 2000 feet, a "climb mode" output parameter should be triggered. Multiple test cases may be implemented against the model and a report may be generated indicating coverage of the model blocks. In this example, a coverage analysis generated against a complete set of test cases may indicate that certain portions of the model, such as a particular transition or state, was not tested or not fully tested (e.g., a particular state was never obtained).

Figure 6:
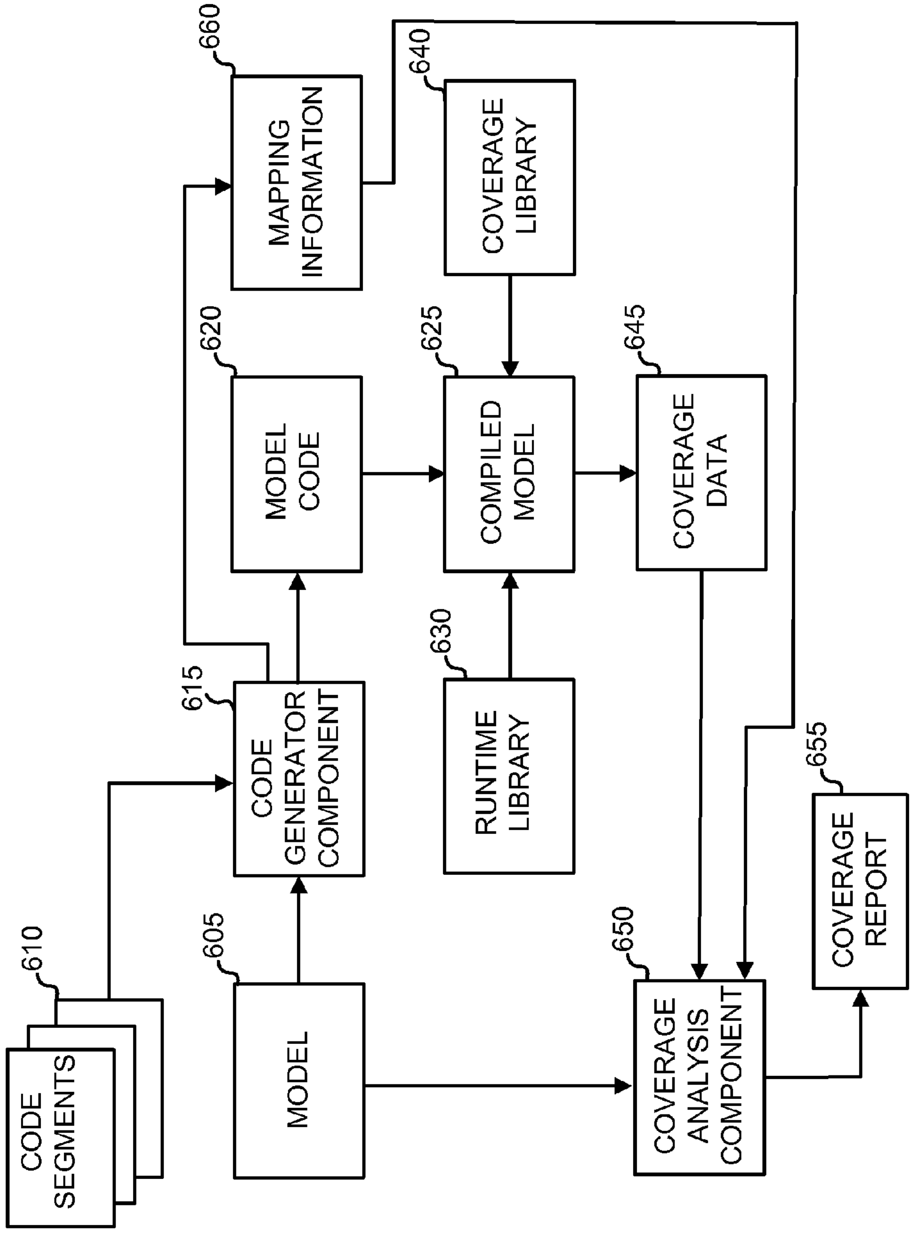
FIG. 6 is a diagram conceptually illustrating exemplary components for generating program code for a model including coverage.

FIG. 6 is a diagram conceptually illustrating exemplary components for generating program code for a model including coverage. In FIG. 6, code segments 610, model 605, code generator component 615, model code 620, compiled code 625, and runtime library 630 may generally perform functions similar to the corresponding elements shown in FIG. 5 (i.e., code segments 510, model 505, code generator component 515, model code 520, compiled code 525, and runtime library 530). Code segments 610 may include additional information describing the definition of coverage for each primitive element in the model that is defined by code segments 610. This information may be input to code generator component 615, or in alternate implementations, the additional information may be added directly to model code 620 or to compiled model 625 by an external tool or by a user via a manual editing or creation of model code 620.

Coverage library 640, coverage data 645, coverage analysis component 650, coverage report 655, and mapping information 660 are additionally shown in FIG. 6. Coverage library 640 may include functions that define how coverage information produced by compiled model code 625 is captured. The coverage information may be stored as coverage data 645. Coverage data 645 may, for instance, be stored as a database or other structure in a computer-readable medium (e.g., main memory 230). Each instance of coverage information may correspond to a coverage point defined in code segments 610. The coverage points included in model code 620 may also include information describing the portion of the model that corresponds to the coverage point. Accordingly, each coverage point in coverage data 645 may be mapped back to model 605 to thereby obtain coverage for model 605.

Mapping information 660 may be additionally generated by code generator component 615 or, in some implementations, by a component separate from code generator component 615. Mapping information 660 may include data that describes the correspondence between code coverage and model coverage for model 605. Code generator component 615 may generate mapping information 660 based on an analysis of the coverage requirements that exist in the model and the coverage requirements that exist in the code. The analysis may determine how constructs in the code that require coverage are related to constructs in the model that require coverage. This analysis is possible because the code generator component 615 has information about the elements that make up the abstract design (i.e., model 605) and the interpretation of these elements in the generated source code. Accordingly, code generator component 615 is able to collect model coverage based upon the structure of model 605 and the instances of the primitive elements (i.e., the code segments 610) used to implement model 605.

As an example of the information embodied in mapping information 660, consider an "if" statement in model code 620. Mapping information 660 may include information that can be used to determine whether the "if" statement corresponds to a model coverage point, and if so, whether there are additional code statements corresponding to the model coverage point.

Coverage analysis component 650 may generate coverage report 655. Coverage report 655 may be generated based on coverage data 645, mapping information 660, and model 605. Coverage report 655 may provide code coverage and model coverage information that corresponds to test cases executed by model 605. In one implementation, coverage report 655 may particularly include mapping information between the coverage information collected on the model and the coverage information collected on the source code. This mapping may be presented as, for example, a bipartite graph or as multiple control flow graphs.

Figure 7:
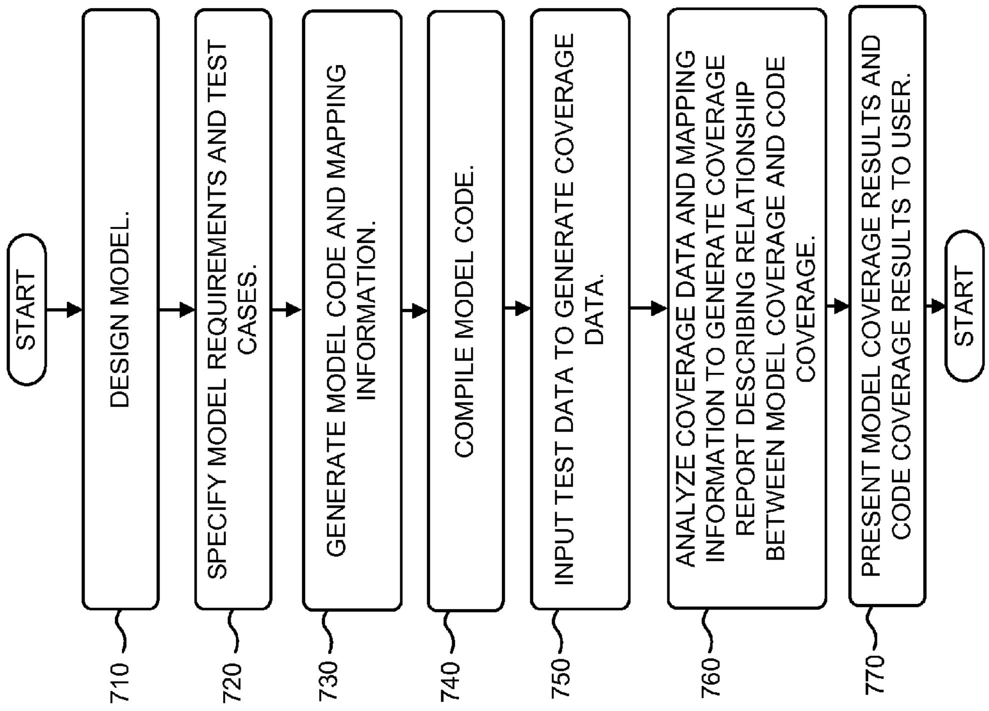
FIG. 7 is a flow chart illustrating an exemplary process for generating and analyzing coverage information for a model.

FIG. 7 is a flow chart illustrating an exemplary process for generating and analyzing coverage information for a model.

A user may begin by designing a model using graphical model creation component 320 (act 710). As discussed with respect to FIG. 4, a user may arrange blocks that represent functionality or data using a graphical interface. Alternatively, instead of actually designing the model, the user may load or otherwise navigate to a model in graphical model creation component 320.

Requirements and test cases may be specified or otherwise retrieved for the active model (act 720). Requirements for a model may be specified as input/output behavior for the model given a series of test cases. Consider, for example, a model designed to implement an autopilot function for an airplane. The requirements may be specified as a list of requirements, two of which may include: (1) altitude climb control is entered whenever the magnitude of the current altitude minus the desired altitude is greater than 1500 feet; and (2) altitude hold control mode and altitude climb control mode are disabled when autopilot enable is false. A number of test cases may be generated from the requirements. For this example, one such test case may be: set the current altitude to the desired altitude then increase desired altitude by 2000 feet and verify that climb mode is triggered.

Model code 620 may next be generated for the model (act 730). Model code 620 may include code that generates the coverage information. Code generator component 615 may generate model code 620 based on code segments 610 and model 605. Additionally, while generating the model code, code generator component 615 may create mapping information 660 (act 730). Mapping information 660 may include data that describes the correspondence between code coverage and model coverage for model 605.

Model code 620 may be compiled to generate compiled model code 625 (act 740). The compiled model code may include the statements relating to model coverage and code coverage.

The model may next be run on the test cases (act 750) to generate coverage data 645. Coverage analysis component 650 may analyze coverage data 645 and mapping information 660 to generate mappings between the coverage information collected on the model and the coverage information collected on the source code (act 760). In one implementation, the mapping information may be represented by a bipartite graph.

Figure 8:
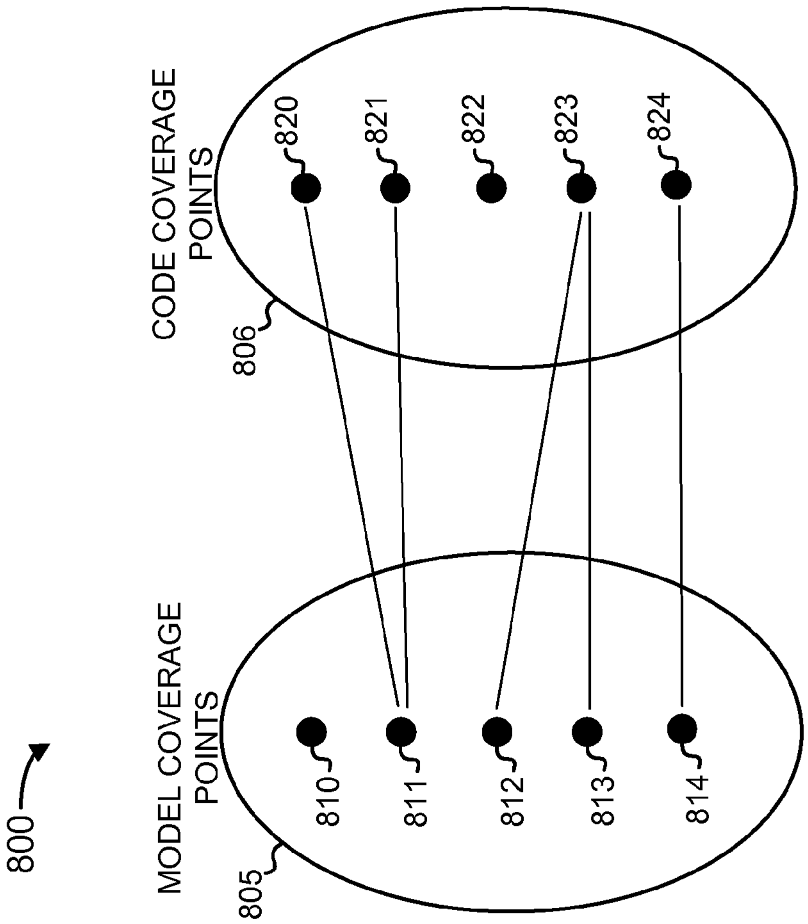
FIG. 8 is a diagram of a bipartite graph presenting exemplary coverage data for a model.

FIG. 8 is a diagram illustrating an exemplary bipartite graph 800 generated by coverage analysis component 650. Bipartite graph 800 may include a set of vertices 805 corresponding to model coverage and a set of vertices 806 corresponding to code coverage. Specifically, as shown in bipartite graph 800, model vertices 805 include vertices 810, 811, 812, 813, and 814, each of which corresponds to a model coverage outcome. Code vertices 806 include vertices 820, 821, 822, 823, and 824, each of which corresponds to a code coverage outcome. Each vertex in sets 805 and 806 may represent a coverage outcome from coverage data 645. Edges (shown as lines between vertices in FIG. 8) between vertices may represent corresponding outcomes between sets 805 and 806. A single model coverage outcome might be associated with several code coverage outcomes if the functional implementation of the model coverage object is in-lined into several places in the code. An example of this situation is shown as model vertex 811, which corresponds to code vertices 820 and 821. The reverse situation can occur when logic from several separate copies of a model element are coded together in a single portion of the generated code. An example of this situation is shown as code vertex 823, which corresponds to model vertices 812 and 813. If two connected vertices both have only their shared edge incident, as demonstrated with vertices 814 and 824, satisfaction of the model or code coverage outcome can be directly determined from the other.

An outcome connected to several corresponding outcomes in the other set, e.g., model vertex 811, can be considered to be satisfied when any one of its corresponding outcomes is satisfied. If an outcome has a single edge connecting it to an outcome with more than one incident edge, e.g., model vertex 812, it may not be possible to know when the outcome is satisfied. It may be inferred that if an outcome with several adjacent outcomes is unsatisfied all of the adjacent outcomes are unsatisfied. When an outcome with several adjacent outcomes is satisfied it may not be possible to know which adjacent outcomes are satisfied. Vertices that have no incident edges correspond to outcomes that do not appear in the other representation. In some implementations, edges in bipartite graph 800 may be additionally annotated with text or graphical information describing the coverage data in more detail.

In summary, using the bipartite graph mapping between model and code coverage it is possible to infer three classes of coverage in the corresponding other representation:

1. Outcomes that are known to be satisfied;
2. Outcomes that are known to be unsatisfied; and
3. Outcomes that are indeterminate.

Additionally, the mapping between model and code coverage may be used to automate the identification of functionality added or removed by code generator component 615. These identified areas could then be verified in additional detail.

The mapping information may be graphically represented to the designer by techniques other than, or in addition to, a bipartite graph. For example, labeled control flow graphs (CFGs) for the model and the model code may be displayed with annotation information relating to coverage.

In general, a CFG is a representation, using graph notation, of all paths that might be traversed by a system during its execution. Each node in a CFG may represent a basic element of the system. For example, when the system is computer code, each CFG node may represent a straight-line piece of code without any jumps or jump targets. Directed edges in the CFG may be used to represent jumps in the control flow.

Figure 9:
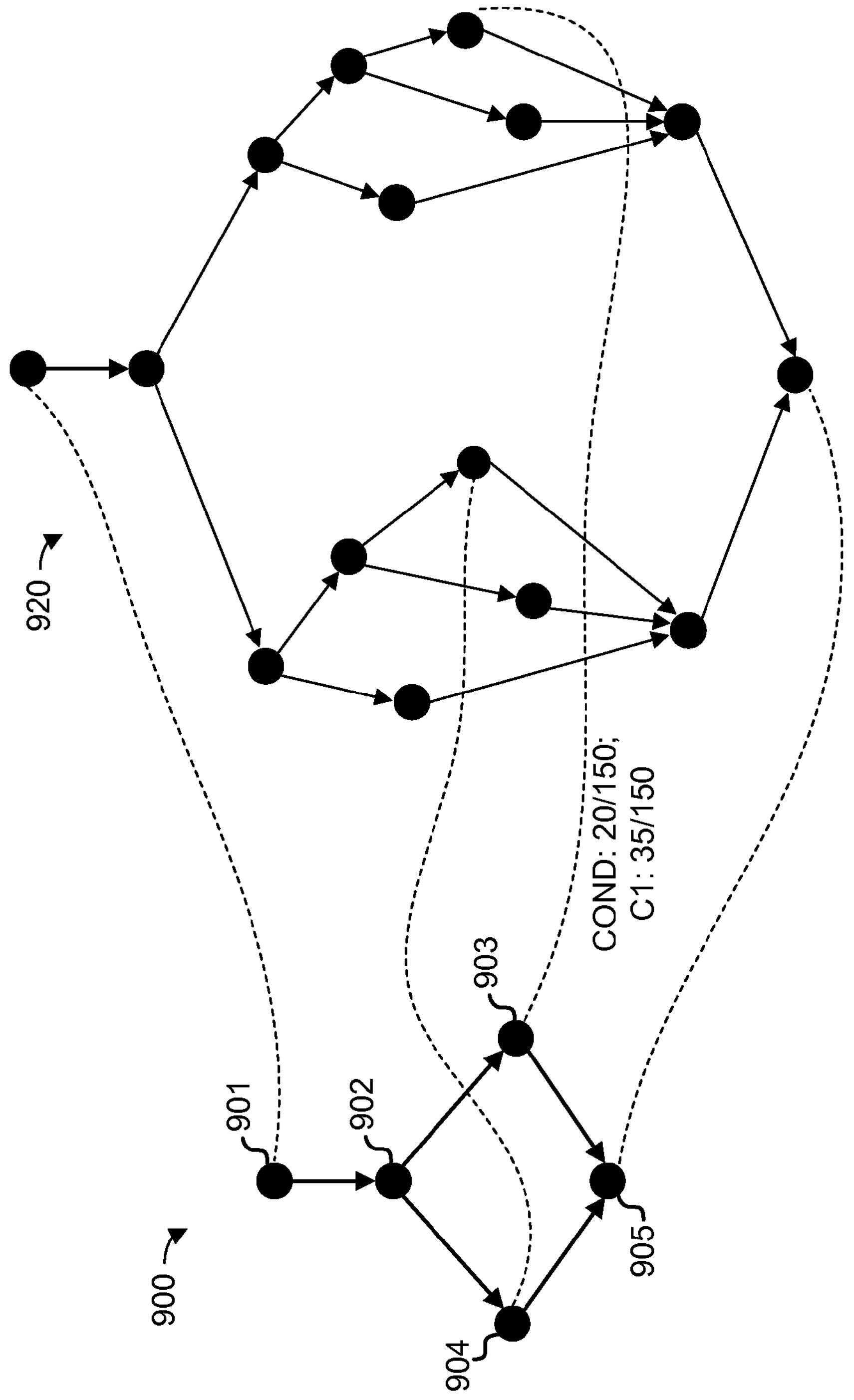
FIG. 9 is a diagram illustrating two exemplary control flow graphs.

FIG. 9 is a diagram illustrating two exemplary control flow graphs, CFG 900 and CFG 920. Assume CFG 900 corresponds to a CFG for the model and CFG 920 corresponds to the CFG for the implementation of the model (e.g., C code for the model).

The model represented by CFG 900 may, for example, implement a switch that includes three inputs: a first possible output value, a second possible output value, and a control value used to determine which of the possible output values to output from the switch. In CFG 900 for the model, node 901 may correspond to the initialization of the model (e.g., reception of the input signals) and node 902 may represent the decision of whether the control value is above or below a threshold. Depending on the decision made at node 902, the output of the model may be assigned to either the first or second possible output values (nodes 903 and 904). The assigned output value may then be output from the model at node 905.

CFG 920 is a control flow graph of the model code for the switch. Nodes in CFG 920 may represent a straight-line section of the code and directed edges in CFG 920 may represent jumps or decisions in the code control flow.

Correspondences between nodes in CFG 905 and CFG 920 may be graphically illustrated to the designer. In FIG. 9, correspondences between nodes in CFG 905 and CFG 920 are particularly illustrated with dashed lines. In this manner, a designer can visually view correspondences between the CFG of the model and the representation of the model. Coverage information may also be used to annotate the various nodes in CFG 905 and CFG 920. For example, assume that node 903 in CFG 905 corresponds to a coverage point that was subjected to 150 tests and was covered 20 times on the model level by using conditional coverage and was covered 35 times on the code level using C1 code coverage, where C1 code coverage indicates how many times a condition evaluated to true and how many times it evaluated to false. The dashed line may accordingly be annotated as COND: 20/150 C1: 35/150. In this manner, the designer may be able to easily view correspondences between coverage points and coverage information relating to the coverage points.

The CFGs and correspondence information shown in FIG. 9 may be generated based on the following procedure: (1) extract the CFG for the model, execute a test suite at the model level, and measure model coverage and annotate the covered/uncovered coverage objectives to the respective parts of the models' CFG; (2) initiate code generation, compilation, linking and downloading to a target; (3) extract the CFG for the generated implementation code, re-execute the test suite on code level, measure code coverage and annotate the covered/uncovered coverage objectives to the respective parts of the codes' CFG; and (4) match the annotated CFGs by using an appropriate graph matching algorithm.

Referring back to FIG. 7, the model coverage results and code coverage results may be presented to the user (act 770). The results may be presented as, for example, bipartite graph 800 or as CFGs. Additionally or alternatively, the results may be presented as a series of formatted reports, such as an HTML report. The results may include upper and lower bounds of the range of coverage. Still further, the results may be presented as indications of the classes of coverage described previously. For example, model 605 may be graphically shown to the user and each block of the model that corresponds to a model coverage outcome may include a graphical indicator indicating whether the corresponding code coverage point is known to be satisfied (class 1), known to be unsatisfied (class 2), or is indeterminate (class 3).

In general, users may use the coverage results in two fundamental ways. As a first way, users may use the coverage results to estimate the coverage that would be achieved in the final target code based on model coverage data collected during simulation. This usage may give the developer confidence that the model, when converted to model code and ported to hardware, will be reliable. A second fundamental way in which users may use coverage results is to project code coverage data collected from field tests and prototype builds back onto the graphical model for interpretation and understanding by the designer or tester.

Advantageously, with the presented coverage results, a user may be able to rapidly understand the relationships between the two types of coverage and rapidly identify portions of a design that cause the coverage to diverge. A user may use the coverage results to, for example, make judgments about the completeness of model testing and the expected effort of any additional verification activities that might be performed on the generated code as a result of missing code coverage. In the reverse direction, the coverage results can provide a useful way to interpret results and pinpoint the cause of missing code coverage. The user may determine, for example, that the missing coverage is the result of a particular optimization or transformation that the user may wish to disable. If the coverage results indicate missing coverage, the user may, for example, revise the model or revise the test cases to obtain a satisfactory level of coverage.

Optimization of Model Coverage

Code generator 615, when generating model code 620, may attempt to optimize the code for efficiency of execution. Mapping information 660 may be particularly used in this situation to associate the resulting code with the graphical model.

Figure 10:
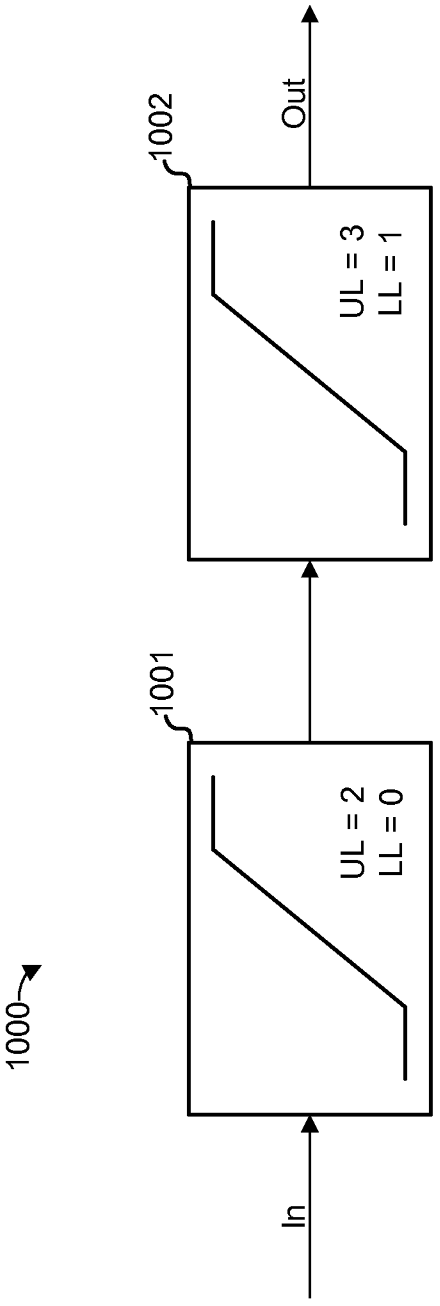
FIG. 10 is a diagram of an exemplary graphical model.

As an example of the use of mapping information when optimizing model code, consider the simple model shown in FIG. 10, which is a diagram illustrating an exemplary graphical model that is composed of two saturation blocks.

Specifically, as shown in FIG. 10, model 1000 includes saturation blocks 1001 and 1002. Saturation blocks 1001 and 1002 function to output a signal identical to the input signal as long as the input signal is within a range determined by an upper limit (UL) parameter and a lower limit (LL) parameter. An input value below the lower limit is output as the lower limit and an input value above the upper limit is output as the upper limit. In FIG. 10, blocks 1001 and 1002 are shown connected sequentially to one another. Block 1001 includes the parameters UL=2 and LL=0. Block 1002 includes the parameters UL=3 and LL=1.

An example of C code implementing the semantics of a single saturation block is shown below in Table I. For the purpose of model coverage based on the semantics of the implementation shown in Table I, one may decide to choose which of the three assignments is invoked (i.e., out=UL, out=LL, or out=in) and consider the coverage as a ratio of the number of assignments that execute divided by three.

TABLE I

```
if (in > UL) {
out = UL;
} else {
if (in < LL) {
out=LL;
} else {
out= in;
}
```

A straightforward approach for implementing model 1000 using the code in Table I for implementing is shown in Table II. Although the code in Table II is functionally correct, it may be desirable to optimize the code shown in Table II to obtain the code in Table III. The optimized code in Table III is functionally identical to that shown in Table II. The optimized code improves code efficiency but, as a side effect, may eliminate the coverage decisions that were present in the model.

TABLE II

```
if (in>2) {
   A=2;
} else {
   If (in<0) {
      A=0;
   } else {
      A=in;
   }
}
if (A>3) {
   out=3;
} else {
   if (A<1) {
      out=1;
   } else {
      out=A;
   }
}
```

TABLE III

```
if (in>2) {
   out = 2;
} else {
   If (in<1) {
      Out=1;
   } else {
      Out-in;
   }
```

In an implementation consistent with aspects described herein, code generator 615 may tag the semantic representation of a block so that the code constructs that remain after optimization can be understood in the context of the original model. To illustrate the concept of tagging consider the commented code shown in Table IV, which illustrates the original and optimized code after tagging. The beginning of a tag on a line is indicated by the symbol "//" followed by the intended tag. As shown in the second column of Table IV, two of the model coverage decisions were eliminated in the optimized code generated from model 1000. In this situation, mapping information 660 may represent how the coverage (i.e., the tags in Table IV) changes between the model representation and the intermediate form of the implemented model (i.e., the optimized code).

TABLE IV

| Original Code After Tagging | Optimized Code After Tagging |
|---|---|
| if (in>2) { / /UL BLk 1001 | If (in>2) { / / UL Blk 1001 |
| A=2; | out = 2; |
| } else { | } else { |
| If (in<0) { / /LL Blk 1001 | If (in<1) { / / LL Blk 1002 |
| A=0; | out=1; |
| } else { | } else { |
| A=in; | out-in; |
| } | } |
| } | |
| if (A>3) { / / UL Blk 1002 | |
| out=3; | |
| } else { | |
| if (A<1) { / / UL Blk 1002 | |
| out=1; | |
| } else { | |
| out=A; | |
| } | |
| } | |

CONCLUSION

Techniques were described herein for generating a mapping between code coverage and model coverage for a design. The determined coverage information may be presented to a user, enabling the user to make decisions relating to the completeness of the coverage testing for the model.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 7, the order of the acts may be modified in other implementations. Further, non-dependent acts may be performed in parallel.

Also, the term "user" has been used herein. The term "user" is intended to be broadly interpreted to include a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving information describing a model, the model including elements;

identifying code segments associated with the elements of the model;

determining, based on the code segments, code corresponding to the model;

determining, based on the code and the model, mapping information representing a correspondence between the code and the model;

executing, based on the code and the mapping information, the model with test data to identify a correspondence between coverage data for the model and coverage data for the code; and providing a graphical indication of the correspondence between the coverage data for the model and the coverage data for the code, the receiving the information, the identifying the code segments, the determining the code, the determining the mapping information, the executing the model, and the providing the graphical indication being performed by a computing device.

2. The method of claim 1, where providing the graphical indication includes:

forming a bipartite graph that depicts the graphical indication of the correspondence between the coverage data for the model and the coverage data for the code.

3. The method of claim 2, where:

vertices, in the bipartite graph, represent coverage outcomes for the coverage data for the model and outcomes for the coverage data for the code, and edges in the bipartite graph represent correspondences between the outcomes for the coverage data for the model and the outcomes for the coverage data for the code.

4. The method of claim 1, where the graphical indication of the correspondence between the coverage data for the model and the coverage data for the code includes a control flow graph.

5. The method of claim 1, further comprising:

determining, based on executing the model, the coverage data for the model and the coverage data for the code;

comparing the coverage data for the model and the coverage data for the code to form comparison results; and generating, based on the comparison results, the graphical indication of the correspondence between the coverage data for the model and the coverage data for the code.

6. The method of claim 1, where the coverage data for the model further includes:

information relating to a plurality of coverage data outcomes for the model and a plurality of coverage data outcomes for the code.

7. The method of claim 6, where the information relating to the plurality of coverage data outcomes for the model and the plurality of coverage data outcomes for the code includes:

a classification for one or more coverage data outcomes, of the plurality of coverage data outcomes for the model and the plurality of coverage data outcomes for the code.

8. The method of claim 7, where the one or more coverage data outcomes include one or more of:

outcomes that are known to be satisfied;

outcomes that are known to be unsatisfied; or outcomes that are indeterminate.

9. A system, comprising:

at least one processor to:

provide an interface to receive data associated with a model, the model including a plurality of blocks included in the model and connections among the plurality of blocks, generate mapping information that identifies a correspondence between the model and code used to implement the model, determine, based on the data associated with the model and the mapping information, coverage information indicating a correspondence between coverage data for the model and coverage data for the code, and provide a graphical indication of the coverage information.

10. The system of claim 9, where the at least one processor, when determining the coverage information, is further to:

execute the model, using test input data, to generate test results, and determine, based on the test results, the correspondence between the coverage data for the model and the coverage data for the code.

11. The system of claim 10, where the at least one processor, when determining the coverage information, is further to:

determine, based on executing the model, the coverage data for the model and the coverage data for the code, compare the coverage data for the model and the coverage data for the code to form comparison results, and determine, based on the comparison results, the correspondence between the coverage data for the model and the coverage data for the code.

12. The system of claim 9, where the at least one processor is further to:

store code segments associated with primitive components of the model, where construction of the model is based on the primitive components of the model.

13. The system of claim 9, where the graphical indication includes at least one of:

a bipartite graph, or a control flow graph.

14. The system of claim 9, where the at least one processor, when determining the coverage information, is further to:

determine information relating to a plurality of coverage outcomes for the model and a plurality of coverage outcomes for the code, the information relating to the plurality of coverage outcomes for the model and the plurality of coverage outcomes for the code including information identifying a classification for one or more coverage data outcomes, of the plurality of coverage outcomes for the model and the plurality of coverage outcomes for the code, and determine the coverage information further based on the classification for the one or more coverage data outcomes, of the coverage outcomes for the model and the coverage outcomes for the code.

15. The system of claim 14, where the one or more coverage data outcomes include one or more of:

outcomes that are known to be satisfied;

outcomes that are known to be unsatisfied; or outcomes that are indeterminate.

16. A non-transitory computer readable medium to store instructions, the instructions comprising:

one or more instructions that, when executed by at least one processor, cause the at least one processor to receive an input from a user to construct a model of a system;

one or more instructions that, when executed by the at least one processor, cause the at least one processor to receive test data, the test data being associated with one or more particular results for the system;

one or more instructions that, when executed by the at least one processor, cause the at least one processor to execute the model using the test data to generate tests results;

one or more instructions that, when executed by the at least one processor, cause the at least one processor to compare the particular results with the generated test results to produce comparison data;

one or more instructions that, when executed by the at least one processor, cause the at least one processor to generate, based on the comparison data, coverage data that indicates a completeness value associated with completeness of the test cases in testing the model; and one or more instructions that, when executed by the at least one processor, cause the at least one processor to present the coverage data to the user.

17. The non-transitory computer-readable medium of claim 16, the instructions further comprising:

one or more instructions to generate, based on the test results, information that includes:

coverage outcomes for code associated with the model, coverage outcomes for the model, and a correspondence between the coverage outcomes for the code and the coverage outcomes for the model.

18. The non-transitory computer-readable medium method of claim 17, where the one or more instructions to present the coverage data include:

one or more instructions to present a graphical indication of the correspondence between the coverage outcomes for the model and the coverage outcomes for the code.

19. The non-transitory computer-readable medium of claim 18, where the one or more instructions to present the graphical indication include:

one or more instructions to form a bipartite graph based on the test results, vertices in the bipartite graph corresponding to the coverage outcomes for the code and the coverage outcomes for the model, and edges in the bipartite graph corresponding to the correspondence between coverage outcomes for the coverage for the model and coverage outcomes for the coverage for the code.

20. The non-transitory computer-readable medium of claim 18, where the one or more instructions to present the graphical indication include:

one or more instructions to graphically identify one or more classifications associated with the coverage outcomes for the model and the coverage outcomes for the code, and where the one or more classifications include:

outcomes that are known to be satisfied, outcomes that are known to be unsatisfied, or outcomes that are indeterminate.

* * * * *

UNITED STATES PATENT AND TRADEMARK OFFICE

CERTIFICATE OF CORRECTION

PATENT NO. : 8,423,345 B1
APPLICATION NO. : 13/534648
DATED : April 16, 2013
INVENTOR(S) : William J. Aldrich et al.

It is certified that error appears in the above-identified patent and that said Letters Patent is hereby corrected as shown below:

In the Claims:

Column 17, claim 18, line 26, following the word "medium" delete "method".

Signed and Sealed this
Ninth Day of July, 2013

Teresa Stanek Rea
*Acting Director of the United States Patent and Trademark Office*